(12) United States Patent
Matano et al.

(10) Patent No.: US 9,827,923 B2
(45) Date of Patent: Nov. 28, 2017

(54) HARNESS ROUTING STRUCTURE FOR ELECTRIC VEHICLE

(71) Applicant: Nissan Motor Co., Ltd., Yokohama-shi, Kanagawa (JP)

(72) Inventors: Shinichi Matano, Atsugi (JP); Kenji Iino, Isehara (JP); Masahiro Onishi, Kamakura (JP)

(73) Assignee: Nissan Motor Co., Ltd., Yokohama (JP)

( * ) Notice: Subject to any disclaimer, the term of this patent is extended or adjusted under 35 U.S.C. 154(b) by 701 days.

(21) Appl. No.: 14/373,380

(22) PCT Filed: Mar. 1, 2013

(86) PCT No.: PCT/JP2013/055637
§ 371 (c)(1),
(2) Date: Jul. 21, 2014

(87) PCT Pub. No.: WO2013/133153
PCT Pub. Date: Sep. 12, 2013

(65) Prior Publication Data
US 2015/0084412 A1 Mar. 26, 2015

(30) Foreign Application Priority Data
Mar. 5, 2012 (JP) ................... 2012-047801

(51) Int. Cl.
B60R 16/02 (2006.01)
B60K 1/04 (2006.01)
(Continued)

(52) U.S. Cl.
CPC ............ B60R 16/0215 (2013.01); B60K 1/04 (2013.01); B60L 7/14 (2013.01); B60L 11/1803 (2013.01);
(Continued)

(58) Field of Classification Search
CPC .................................................. B60L 11/1809
(Continued)

(56) References Cited

U.S. PATENT DOCUMENTS

2012/0038319 A1* 2/2012 Sekido ................ B60L 11/1809
320/109

FOREIGN PATENT DOCUMENTS

JP 2001-239898 A 9/2001
JP 2010-247642 A 11/2010
(Continued)

Primary Examiner — Daniel Kessie
(74) Attorney, Agent, or Firm — Global IP Counselors, LLP

(57) ABSTRACT

An electric vehicle harness routing structure is provided for an electric vehicle having an electric motor as a drive source, a control device to control the electric motor as well as charging of a battery for power supply to the electric motor, and a power unit elastically supported on a vehicle body. The harness routing structure includes a charging port, a quick charging harness, a normal charging harness, a first quick-charge harness clip, a second quick-charge harness clip, a first normal-charge harness clip and a second normal-charge harness clip. The clips of the electric vehicle harness routing structure is provided such that when connecting a relatively movable power unit and charging ports with the quick charging harness and the normal charging harness, it is possible to prevent interference of between the charging harnesses.

8 Claims, 9 Drawing Sheets

(51) Int. Cl.
    *B60L 11/18*     (2006.01)
    *B60L 7/14*      (2006.01)
(52) U.S. Cl.
    CPC ......... *B60L 11/185* (2013.01); *B60L 11/1809*
            (2013.01); *B60L 11/1818* (2013.01); *B60L*
        *11/1877* (2013.01); *B60L 2210/10* (2013.01);
            *B60L 2210/30* (2013.01); *B60L 2210/40*
        (2013.01); *B60L 2270/145* (2013.01); *B60L*
        *2270/147* (2013.01); *Y02T 10/7005* (2013.01);
                *Y02T 10/705* (2013.01); *Y02T 10/7072*
            (2013.01); *Y02T 10/7216* (2013.01); *Y02T*
            *10/7241* (2013.01); *Y02T 90/121* (2013.01);
                *Y02T 90/127* (2013.01); *Y02T 90/128*
                    (2013.01); *Y02T 90/14* (2013.01)
(58) Field of Classification Search
    USPC .................................................. 307/10.1, 9.1
    See application file for complete search history.

(56)             References Cited

FOREIGN PATENT DOCUMENTS

| JP | WO 2010133934 A1 | * | 11/2010 | ............... B60K 1/04 |
| JP | 2011-20622 A | | 2/2011 | |
| JP | 2011-155763 A | | 8/2011 | |

* cited by examiner

HARNESS ROUTING STRUCTURE FOR ELECTRIC VEHICLE

This application is a U.S. National stage application of International Application No. PCT/JP2013/055637, filed Mar. 1, 2013, which claims priority to Japanese Patent Application No. 2012-047801 filed in Japan on Mar. 5, 2012. The entire disclosure of Japanese Patent Application No. 2012-047801 is hereby incorporated herein by reference.

BACKGROUND

Field of the Invention

The present invention relates to a harness routing structure for an electric vehicle in which a power unit and a charging port are connected by a charge cable or harness.

Background Information

Conventionally, it is known that a converter, a charger, and a charging port are fixed respectively to a vehicle body for charging control of a power supply battery for a vehicle propulsion electric motor. The charging port and the converter are connected by a pair of quick charge cables or harnesses while the charging port and the charger are connected by a normal charge harness (for example, see Japanese Laid-Open Patent Application Publication No. 2011-20622 A).

SUMMARY

Incidentally, in the harness routing structure in a conventional electric vehicle, the converter/charger and the charging port are all fixed to a vehicle body. Thus, there is no possibility that the charging port moves relative to the converter/charger. For this reason, a quick charge harness and a normal charge harness, which connect these, are not subject to deformation due to vibrations so that these have been free-routed to fit the vehicle layout. However, if one of the converter/charger and the charging port is fixed elastically to the vehicle body, upon vibration, the converter/charger and the charging port move relative to each other. Thus, it is necessary to deform each charge harness in accordance with the relative movement described above so as to prevent the occurrence of damage to the harness. Here, the flexibility of the normal or regular charge cable is generally higher than that of the quick charge harness. The normal charge harness is more easily deformed due to the vibration. Therefore, in the case in which an equal extent of allowance (deflection) is imparted to a not-constrained, i.e., free portion of the harnesses, the amount of deformation of the normal charging harness becomes larger than the amount of deformation of the quick charging harness. This causes a problem to produce different vibration states or modes between the normal charging harness and the quick charging harness so that the normal charging harness may contact with the quick charging harness.

The present invention has been made in view of the above problem and aims to provide a harness routing structure for an electric vehicle that is capable of preventing interference of both the charging harnesses when connecting the relatively movable power unit and the charging port by the quick charging harness and the normal charging harness.

In order to achieve the above object, a harness routing structure for an electric vehicle according to the present invention comprises a power unit, a charging port, and a quick charging harness, a normal charging harness, a first quick-charge harness clip, a second quick-charge harness clip, a first normal-charge charge harness clip, and a second normal-charge harness clip. The power unit includes an electric motor as a drive or propulsion source and a control device for controlling the electric motor and supplying power to the electric motor. The power unit is resiliently supported on the vehicle body. The charging port is fixedly supported on the vehicle body. The quick charge harness connects the charging port and the power unit. In addition to connecting the charging port and the power unit, the normal charging harness is more flexible than the quick charging harness. A first quick charge harness clip is fixed to the vehicle body in the middle of the quick charging harness. A second quick-charge harness clip is fixed to the power unit in the middle of the quick charging harness between the first quick-charge harness clip and the power unit. A first normal-charge harness clip is fixed to the vehicle body in the middle of the normal charging harness. A second normal-charge harness clip is fixed to the power unit in the middle of the normal charging harness between the first normal-charge harness clip and the power unit. Then, the normal charging harness that extends between a normal body-side constraint point defined by the first normal-charge clip harness and a normal unit-side constraint point defined by the second normal-charge clip harness is shorter in length than the quick charging harness that extends between a quick body-side constraint point defined by the first quick-charge harness clip and the second unit-side constraint point defined by the second quick-charger harness clip.

In the harness routing structure for an electric vehicle according to the present invention, the normal charging harness between the normal body-side constraint point and the normal unit-side constraint point is configured to be shorter in length by the quick charging harness between the quick body-side constraint point and the quick unit-side constraint point. In other words, with respect to the length of a free portion which is not constrained, the normal charging harness is shorter than the quick charging harness so that the allowance (deflection) the normal charging harness can afford will be smaller. As a result, the normal charging harness having more flexibility is configured to be less likely to be deformed in accordance with the vibration than the quick charging harness. Therefore, when the power unit oscillates and the vibration is input through the second quick-charge harness clip and the second normal-charge harness clip to the quick charging harness and the normal charging harness, respectively, the deformation of the normal charging harness will be suppressed so that the normal charging harness is less likely to contact the quick charging harness to thereby prevent the interference of the two charging harness.

BRIEF DESCRIPTION OF THE DRAWINGS

Referring now to the attached drawings which form a part of this original disclosure.

DETAILED DESCRIPTION OF THE EMBODIMENTS

Figure 1:
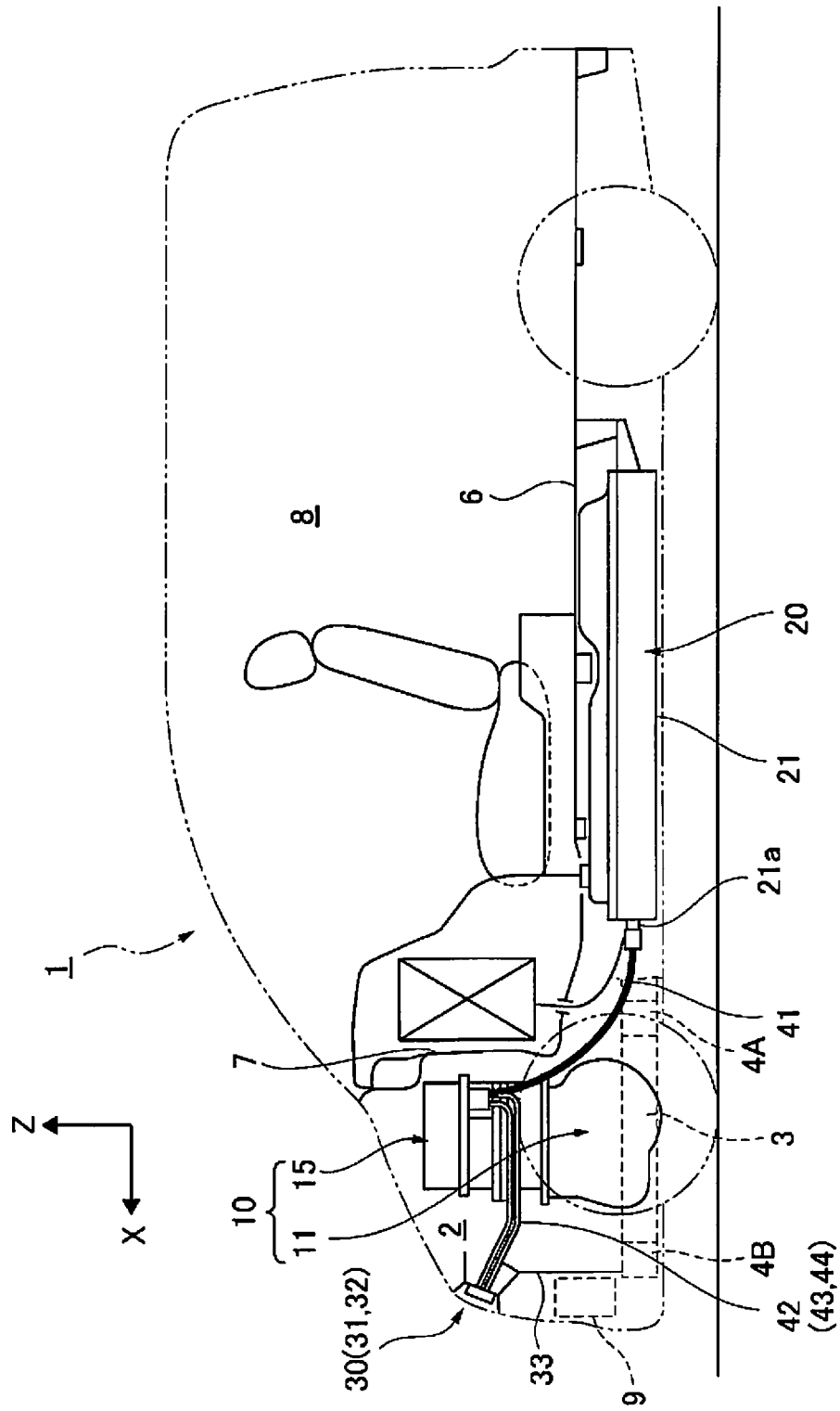
FIG. 1 is an overall side view showing a main structure of an electric vehicle to which the harness routing structure in a first embodiment is applied.

Below, a description is given of a mode for carrying out the harness routing structure for an electric vehicle according to the present invention with reference to a first embodiment shown in the drawings.

First Embodiment

First, the configurations in the harness routing structure for an electric vehicle in the first embodiment will be described in the "basic configuration of the electric vehicle", the "routing structure of the quick charging harness", and the "routing structure of the normal charging harness", separately.

Basic Configuration of the Electric Vehicle

Figure 2:
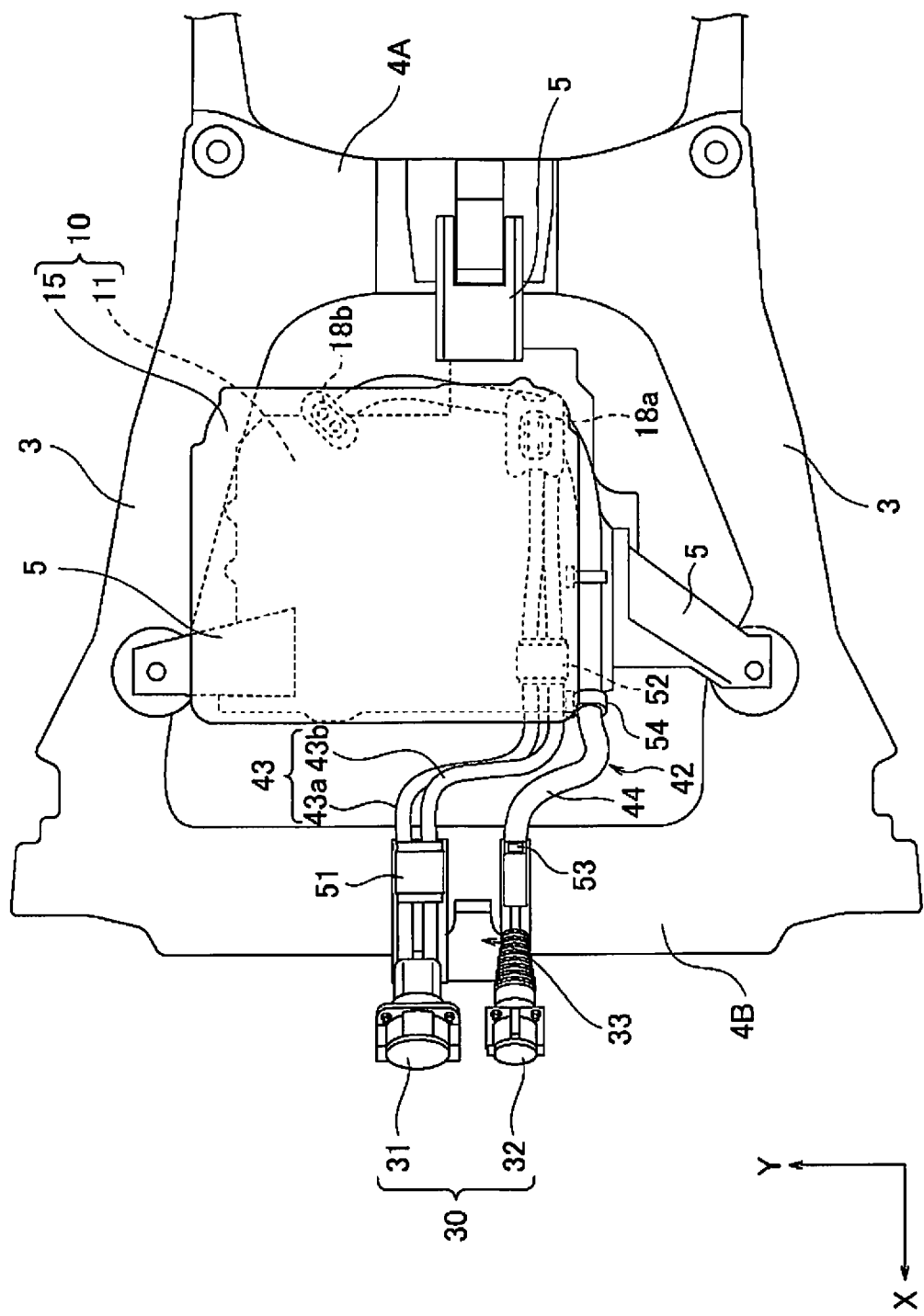
FIG. 2 is a schematic plan view showing a front main structure of an electric vehicle to which the harness routing structure of the first embodiment is applied.
Figure 3:
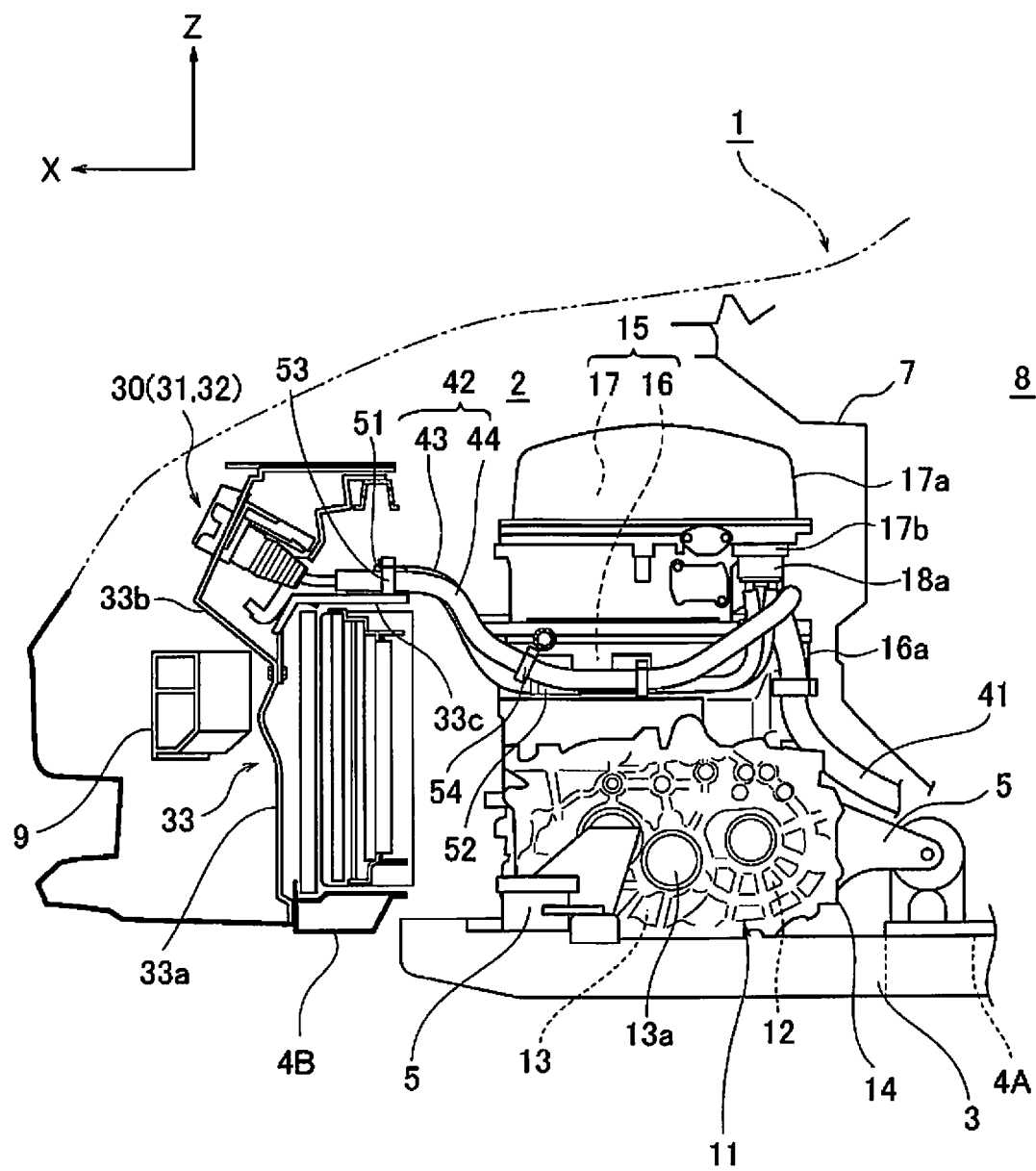
FIG. 3 is a schematic side view showing the front main structure of an electric vehicle to which the harness routing structure of the first embodiment is applied.

FIG. 1 is an overall side view showing a main structure of an electric vehicle to which the harness routing structure in a first embodiment is applied. FIG. 2 is a schematic plan view showing a front main structure of an electric vehicle to which the harness routing structure of the first embodiment is applied. FIG. 3 is a schematic side view showing the front main structure of an electric vehicle to which the harness routing structure of the first embodiment is applied. In the drawings, the direction indicated by the arrow X is the vehicle longitudinal direction, the direction indicated by the arrow Y is the vehicle width direction, and the direction indicated by the arrow Z is the vertical direction of the vehicle.

As shown in FIG. 1, the electric vehicle 1 in the first embodiment includes a power unit 10, a battery unit (battery) 20, and a charging port 30.

The power unit 10 includes a motor drive unit 11, a high-power unit 15 (control device) mounted integrally on the top of the motor drive unit 11, and is arranged in a motor room or compartment formed forward of the vehicle body. Here, the power unit 10 is elastically supported on each of a pair of front side members 3, 3 (vehicle body) extending in the vehicle longitudinal direction and on a first front cross member 4A disposed rearward of the power unit 10 and connecting the pair of the front side members 3, 3 (vehicle body) via a mount member 5. In other words, the power unit 10 is elastically supported on the vehicle body (here, the pair of front side members 3, 3, and the first front cross member 4A) through a mount member 5. Note that the mount member 5 is attached to a motor drive unit 11 disposed on the lower side of the power unit 10.

The motor drive unit 11 includes an electric motor as a propulsion drive source of the electric vehicle, a reduction gear 13 to transmit the rotation of the electric motor 12 to a differential gear 13a at a reduced speed, and a motor housing accommodating the electric motor 12 and the reduction gear 13). Here, the electric motor 12 is used as the generator motor 12 (regeneration mode) in addition to being used as a drive source (driving mode).

The high-power or high-voltage unit 15 is intended to control the motor drive unit 11 as well as to control charging of the battery unit 20, and includes an inverter 16, and a high-voltage module 17.

The inverter 16 is connected to the motor drive unit 11 via a three-phase AC harness (not shown) and changes three-phase alternating current to direct current and vice versa. Here, during the drive mode of the electric motor 12, the inverter 16 converts the direct current from the high-voltage module 17 to the three-phase alternating current to supply to the electric motor 12. During the regenerative mode of the electric motor 12, the inverter 16 is operable to convert the three-phase alternating current from the electric motor 12 to the direct current to supply to the high-voltage module 17. Note that the inverter 16 is built in the inverter housing 16a, and the inverter 16 is mounted immediately above the motor drive unit 11.

The high-voltage module 17 is a voltage control device for controlling the power to be supplied to the motor drive unit 11 or the voltage of the power to charge the battery unit 20, and has a DC/DC converter and a battery charger. This high-voltage module 17 is accommodated within a module housing 17a and is mounted immediately above the inverter 16. Further, the high-voltage module 17 is connected to the battery unit 20 via a charge/discharge harness 41, to a charging port 30 via a charging harness 42, and to the inverter 16 via the high-voltage harness (not shown), respectively. Further, the DC/DC converter converts a quick charging voltage from an external quick charging to a charging voltage to charge the battery unit 20. Moreover, the DC/DC converter 20 converts the charging voltage from the battery unit 20 to a drive voltage to supply to the inverter 16 during the drive mode of the electric motor 12 while, during the regeneration mode of the electric motor 12, the DC/DC converter will convert the generated voltage from the inverter 16 to the charging voltage to charge the battery unit 16. Furthermore, the charger is operable to convert a normal charging voltage from an external normal charging power source (not shown) to a charging voltage to charge the battery unit 20.

The battery unit 20 stores an electric power supplied through the charging port 30 or the electric power regenerated by the electric motor 12 as well as supplying the stored electric power to drive the electric motor 12. The battery unit 20 includes a great number of battery modules, a control circuit to control the charging/discharging and other operations of these battery modules, a cooling and related units, and a battery housing incorporating these components. The front end central portion of the battery housing 21 is formed with a charge/discharge terminal 21a for connecting the charge/discharge harness 41. Further, as the secondary battery, a lithium ion battery, a rechargeable nickel-cadmium battery, nickel hydrogen battery and the like may be used. In addition, the battery unit 20 is disposed below the vehicle floor 6 located in the rear of the motor room 2. The dash panel 7 is erected between the motor room 2 and the vehicle body floor 6. The vehicle body floor 6 constitutes the floor of a passenger compartment 8 which is divided from the motor room 2 by a dash panel 7.

The charging port 30 is a power receiving unit for receiving an external power to charge the battery unit 20 by establishing a contact connection with an external power source (not shown), and includes a quick charging port 31 and a normal charging port 32. Further, through a charging port bracket 33, the charging port 30 is held in a substantially middle position in the vehicle width direction of the front portion of the motor room 2 and above a front bumper 9. That is, the charging port 30 is disposed in front of the power unit 10. In addition, the charging port bracket 33 includes a leg portion 33a, a port housing 33b, and a clip fixing portion 33c. The leg portion 33a is fixed at its lower end to a second front cross member (vehicle body) 4B that connects in the front of the power unit 10 the pair of front side members 3, 3 and extends upwardly. The port housing 33b is fixed to the upper portion of the leg portion 33a and holds the charging port 30. The clip fixing portion 33c fixedly supports the charging harness 42 connected to the charging port 30 in the vicinity of the port housing 33b. In other words, the charging port 30 is fixedly supported on the vehicle body (here, second front cross member 4B) via the charging port bracket 33.

The quick charging port 31 is intended for connecting thereto a quick charger as a high-voltage direct current source, and is connected to the high-voltage module 17 through the quick charging harness 43 of the charging harness 42 through which high-voltage current flows.

The normal charging port 32 is intended for connecting thereto a low voltage AC power source of 100 to 200 volts for household, and is connected to the high-voltage module 17 through the normal charging harness 44 out of the charging harness 42 through which current flows at a voltage lower than that in the quick charging harness 43.

Routing Configuration of the Quick Charging Harness

Figure 4:
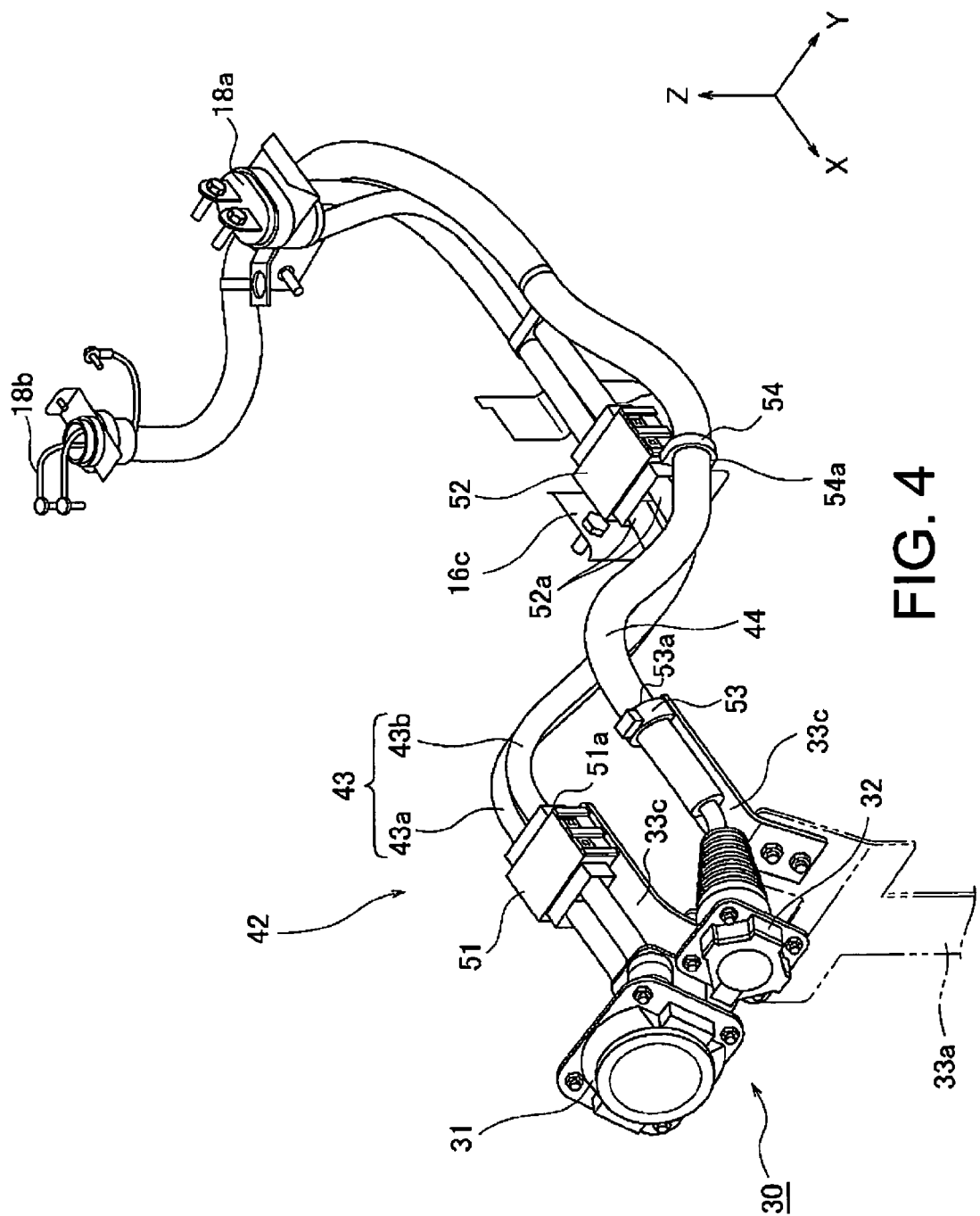
FIG. 4 is a perspective view showing a quick charging harness and a normal charging harness in the first embodiment.
Figure 5:
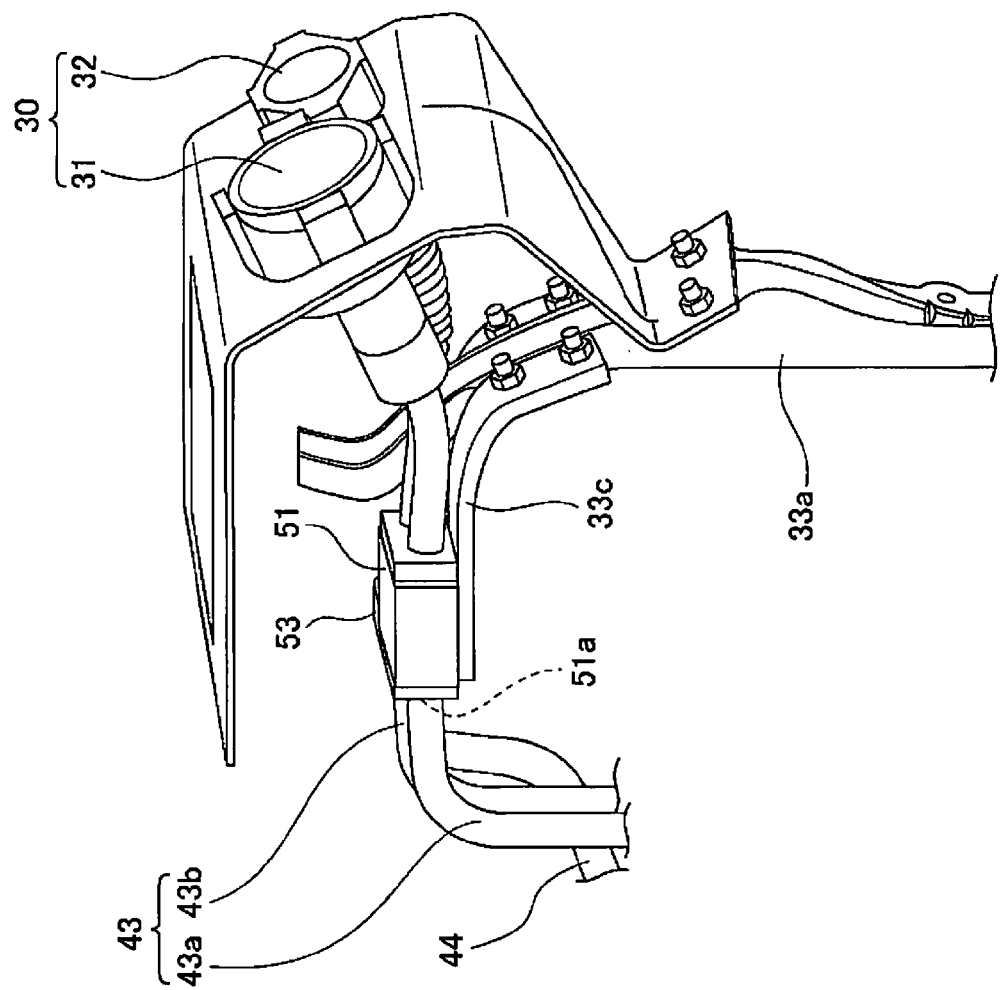
FIG. 5 is a perspective view showing a first quick-charge harness clip to secure the quick charging harness in the first embodiment.
Figure 6:
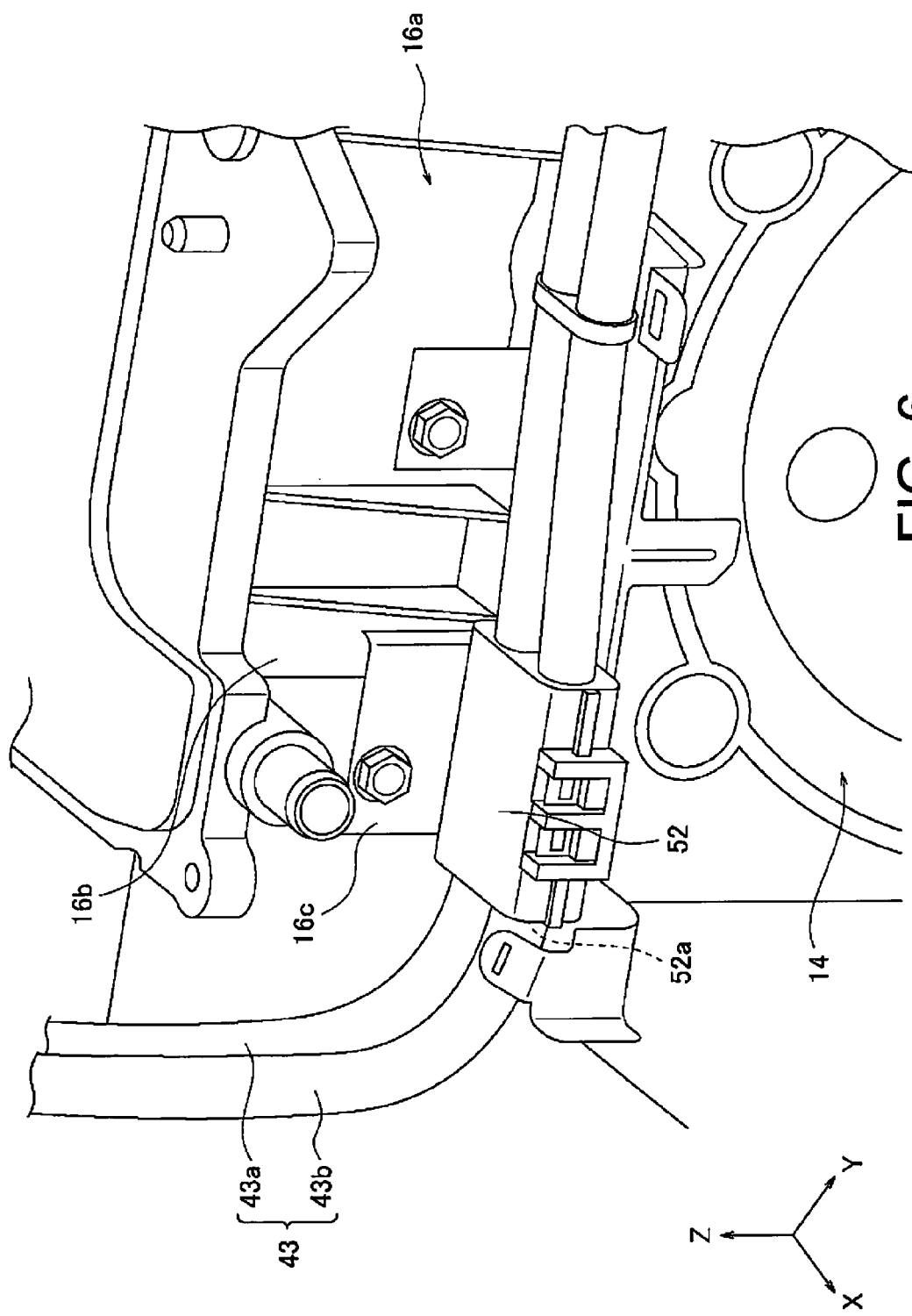
FIG. 6 is a perspective view showing a second quick-charge harness clip to secure the quick charging harness in the first embodiment.
Figure 7A:
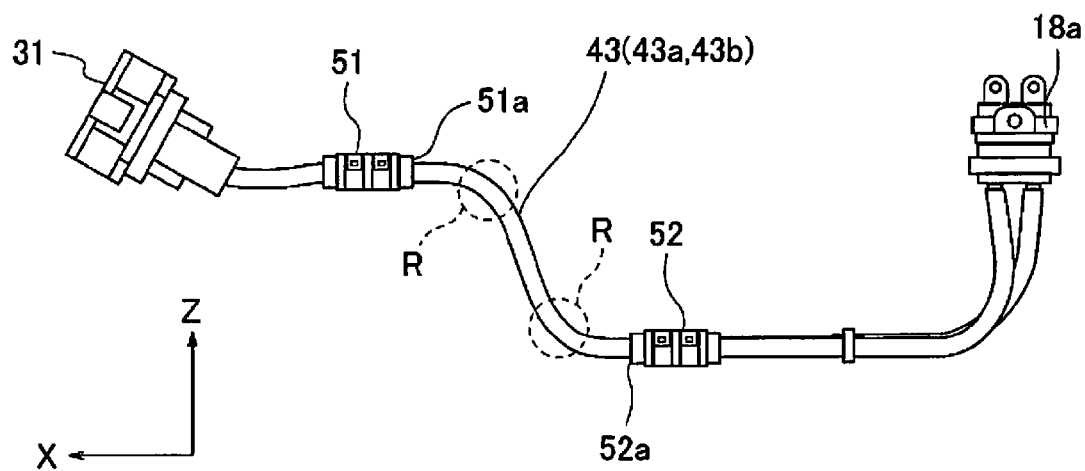
FIG. 7A is a side view showing the quick charging harness in the first embodiment.
Figure 7B:
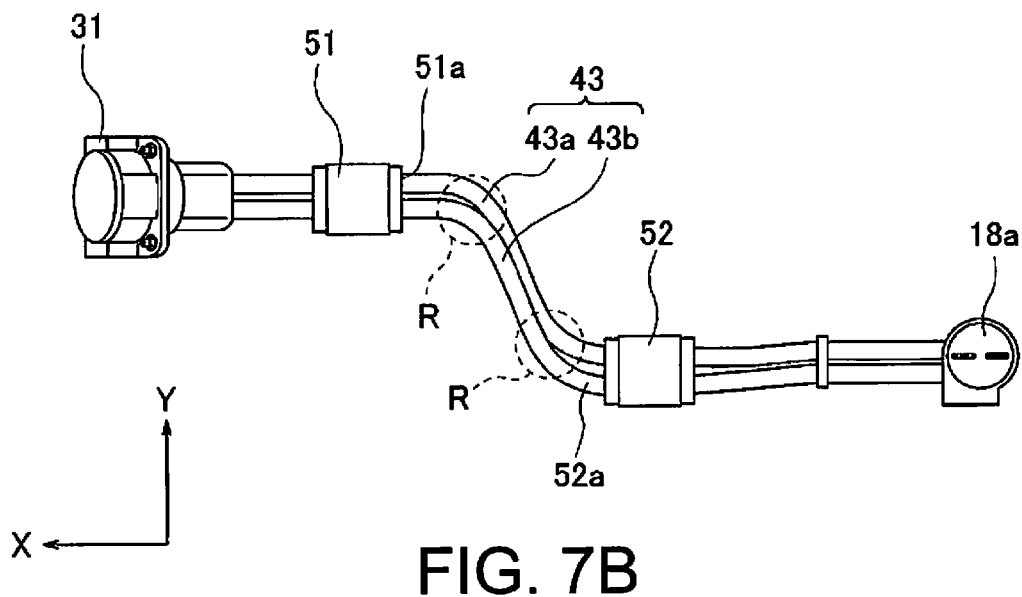
FIG. 7B is a plan view showing the quick charging harness in the first embodiment.
Figure 7C:
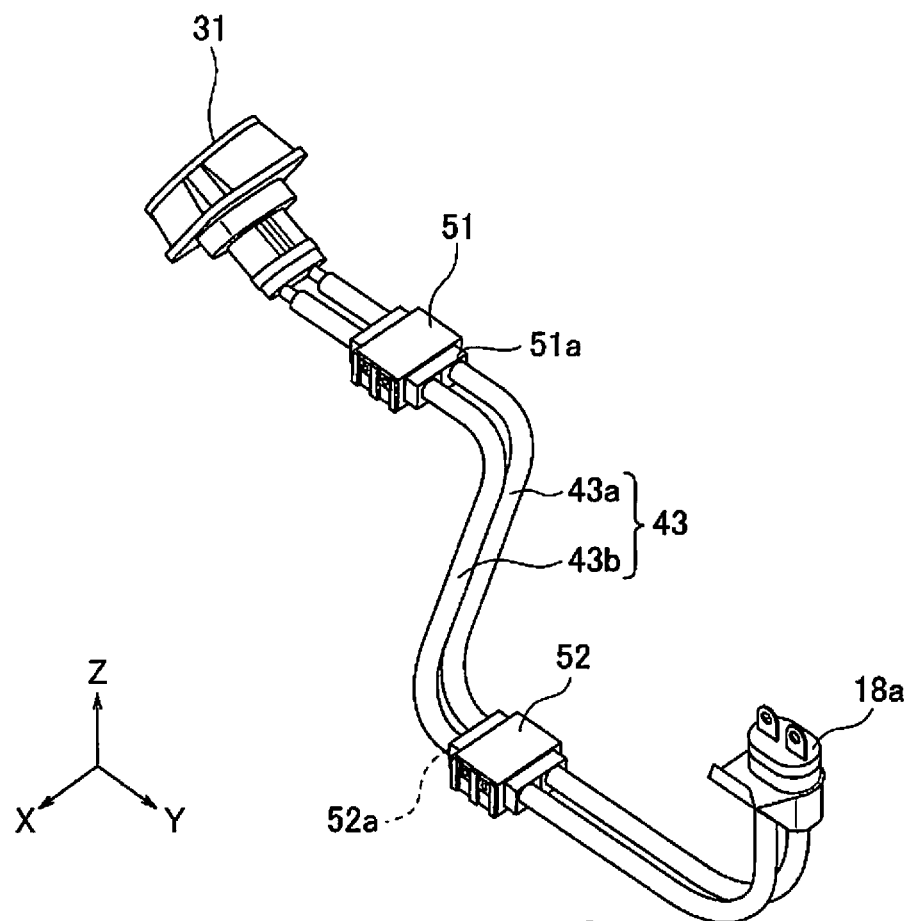
FIG. 7C is a perspective view of the quick charging harness in the first embodiment when viewed from the rear of the vehicle.
Figure 7D:
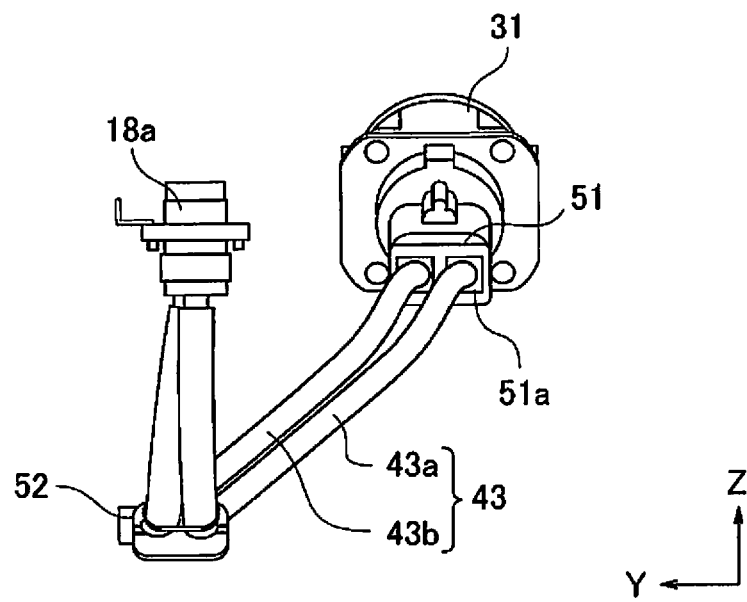
FIG. 7D is a rear view of the quick charging harness in the first embodiment when viewed from the rear of the vehicle.

FIG. 4 is a perspective view showing a quick charging harness and a normal charging harness in the first embodiment; FIG. 5 is a perspective view showing a first quick-charge harness clip to secure the quick charging harness in the first embodiment; FIG. 6 is a perspective view showing a second quick-charge harness clip to secure the quick charging harness in the first embodiment. FIG. 7A is a side view showing the quick charging harness in the first embodiment. FIG. 7B is a plan view showing the quick charging harness in the first embodiment. FIG. 7C is a perspective view of the quick charging harness in the first embodiment when viewed from the rear of the vehicle. FIG. 7D is a rear view of the quick charging harness in the first embodiment when viewed from the rear of the vehicle. In the drawings, the direction indicated by the arrow X is the vehicle longitudinal direction, the direction indicated by the arrow Y is the vehicle width direction, and the direction indicated by the arrow Z is the vertical direction of the vehicle, respectively.

The quick charging harness 43 is composed of a pair of harnesses (first harness 43a, second harness 43b) with one end connected to the quick charging port 31 and the high-voltage connecter 18a provided on the other end is connected to the quick charge harness connection terminal 17b. Since a relatively high-voltage current flows through the first harness 43a and the second harness 43b, the normal charging harness 44 is greater in the harness diameter than the normal charge harness 44 and has such rigidity so as to be hardly deformed by its own weight. Further, in this case, the minimum radius of curvature when bending the first and second harnesses 43a and 43b is set about at R120 mm to R130 mm.

Further, the quick charging harness 43 is fixed to the clip fixed portion 33c of the charging port bracket 33 through the first quick-charge harness clip (first harness clip) 51 in the middle or intermediate position 31 near the quick charging port 31. In addition, through the second quick charge harness clip (second harness clip) 52, the middle position of the quick charging harness 43 between the first quick-charge harness clip 51 and the high-voltage module 17 is secured to the high-voltage module 17 of the power unit 10. It should be noted that this second quick-charge harness clip 52 is attached to a clip bracket (16c) provided on the side surface 16b facing in the width or lateral direction of the vehicle with respect to the inverter housing 16a.

The first quick-charge harness clip 51 is configured such that, as shown in FIG. 5, a part of the quick charging harness 43 is restrained in the length direction with a predetermined constraint width. Of the quick charging harness 43, the portion that is bound or secured to the first quick-charge harness clip 51 is constrained in the horizontal direction with respect to the vertical direction of the vehicle while maintaining the harness spacing between the first harness 43a and the second harness 43b.

The second quick-charge harness clip 52 is configured such that, as shown in FIG. 6, a part of the quick charging harness 43 is restrained in the longitudinal direction with a predetermined constraint width. Of the quick charging harness 43, the portion that is bound to the second quick-charge harness clip 52 is constrained in the horizontal direction with respect to the vertical direction of the vehicle while maintaining the inter-harness spacing between the first harness 43a and the second harness 43b.

Further, the second quick-charge harness clip 52 is provided at a lower position than the height position of the first quick-charge harness clip 51. That is, the first quick-charge harness clip 51 is provided at a height substantially equal to the quick charging port 31. On the other hand, the second quick-charge harness clip 52 is provided in a position lower than the quick charging port 31 and at about the same height position as the boundary between the motor drive unit 11 of the power unit 10 and the high-voltage unit 15. Therefore, the height of the first quick-charge harness clip 51 and the height of the second quick-charge harness clip 52 are different from each other. With the height position of the first quick-charge harness clip 51 taken as a reference, the second quick-charge harness clip 52 is offset, with respect to the height position of the first quick-charger harness clip 51, to the side of the mount member 5 that elastically supports the lower part of the power unit 10 (see FIG. 3). Further, the first quick-charge harness clip 51 is disposed in a substantially central position in the vehicle width direction immediately after the quick charging port 31. In contrast, the second quick-charge harness clip 52 is disposed on a side surface (in this case, the side surface 16b facing the side of the inverter housing 16a) of the power unit 10 so that is offset in the outer side of the vehicle width from the first quick-charge harness clip 51. Stated another way, the vehicle width positions of the first quick-charge harness clip 51 and that of the second quick-charge harness clip 52 are different from each other.

On the other hand, between the quick body-side constraint point 51a defined or formed by the first quick-charge harness clip 51 and the quick unit-side constraint point 52a formed by the second rapid charge harness clip 52, a larger length (with margin length) is provided while the power unit 10 is stationary than a distance (a linear length obtained by connecting the quick body-side constraint points 51a and the quick unit-side constraint points 52a by a straight line, hereinafter referred to as "inter-distance of constraint points"). That is, the quick charging harness 43 is provided with two R portions curved in the vehicle vertical direction (indicated by R in FIG. 7A) at two points between the quick body-side constraint point 51a and the quick-charge unit-side constraint point 52a. Further each harness 43a, 43b located between the two R portions is inclined and the R portion is also bent or curved in the vehicle width direction (see FIG. 7B). It should be noted that the margin length of the quick charging harness 43 will be set at least longer than the size of possible vibration amount of the mount member 5.

Furthermore, with respect to the quick charging harness 43, between the quick vehicle body-side constraint points 51a and the quick unit-side constraint points 52a, the length of the first harness 43a and that of the second harness 43b are aligned. In other words, the length of the first harness 43a between the quick body-side constraint point 51a and the quick unit-side constraint point 52a and the length of the second harness 43b between the quick body-side constraint point 51a and the quick unit-side constraint point 52a are the same. Further, between the quick vehicle body-side constraint points 51a and the quick unit-side constraint points 52a, with respect to the quick charging harness 43, the first harness 43a and the second harness 43b are routed in parallel to each other so that the harness space therebetween is set to be constant.

Note that the "quick vehicle body constraint point" refers to an end on the side of the power unit 10 out of a portion of the quick-charge harness 43 that is constrained by the first quick-charge harness clip 51. Further, the "quick unit-side constraint point" refers to an end on the side of the charging port 30 out of the portion of the quick charging harness 43 constrained by the second quick-charge harness clip 52.

Routing Configuration of Normal Charging Harness

Figure 8A:
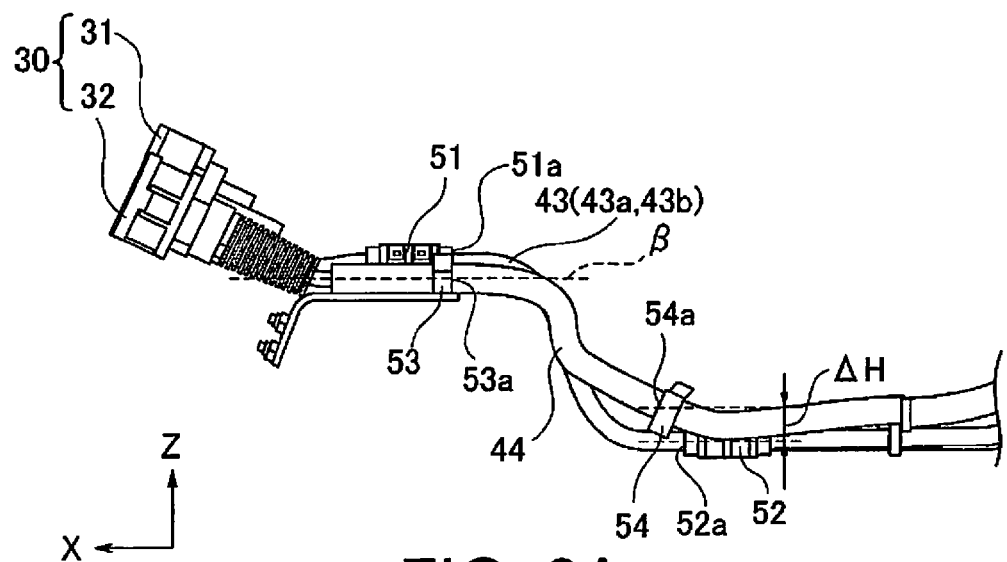
FIG. 8A is a side view showing the normal charging harness and quick charging harness in the first embodiment.
Figure 8B:
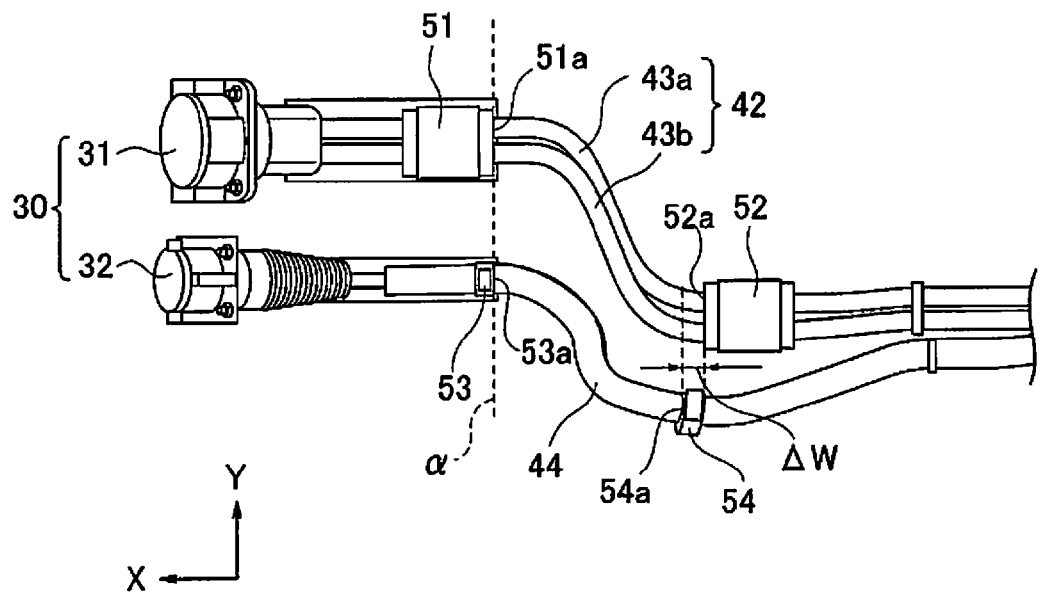
FIG. 8B is a plan view showing the normal charging harness and the quick charging harness in the first embodiment.

FIG. 8A is a side view showing the normal charging harness and quick charging harness in the first embodiment. FIG. 8B is a plan view showing the normal charging harness and the quick charging harness in the first embodiment. In the drawings, the direction indicated by the arrow X is the vehicle longitudinal direction, the direction indicated by the arrow Y is the vehicle width direction, and the direction indicated by the arrow Z is the vertical direction of the vehicle, respectively.

The normal charging harness 44 is configured together in one by covering a harness pair (not shown) with a buffer member harness pair (not shown), in which one end is connected to a normal charging port 32 while the other end 18b is connected to a normal-charge harness connection terminal (not shown) of the high-voltage module 17. Here, the current of relatively low voltage flows in the normal charging harness. Thus, the normal charging harness has a harness diameter smaller than the quick charging harness 43, and has a rigidity to allow to be deformed by its own weight. That is, the normal charging harness 44 has more flexibility than quick charging harness 43. In addition, this normal charging harness 44 is routed to the outside in the vehicle width direction of the quick charging harness 43.

Further, through the first normal charging harness clip 53, the middle of the normal charging harness 44 may be secured to the clip fixing portion 33c of the charging port bracket 33. Further, the normal charging harness 44 is fixed to the high-voltage module 17 of the power unit 10 at the middle position between the first normal-charge harness clip 53 and the high-voltage module 17 through the second normal-charge harness clip 54. Note that the second normal-charge harness clip 54 is mounted to the clip bracket 16c.

The first normal-charge harness clip 53 is configured such that, laterally of the first quick-charge harness clip 51, a part of the normal charging harness 44 is restrained in the length direction with a predetermined constraint width. Of the normal charging harness 44, the portion that is bound to the first normal-charge harness clip 53 is constrained in the horizontal direction with respect to the vertical direction of the vehicle. Further, the normal body-side constraint point 53a of the first normal-charge harness clip 53 is aligned or coincident both in the vehicle longitudinal position, as shown by a broken line a in FIG. 8B, and in the vehicle vertical position, as shown by a broken line β in FIG. 8A, with the quick-charge body-side constraint point 51a of the first quick charging harness 51. The "normal vehicle-body restraint point" refers to an end on the side of the power unit 10 of the portion of the normal charging harness 44 constrained by the first normal-charge harness clip 53.

The second normal-charge harness clip 54 is configured such that, laterally of the second quick-charge harness clip 52, a part of the normal charging harness 44 is restrained in the length direction with a predetermined constraint width. Of the normal charging harness 44, the portion that is bound to the second normal-charge harness clip 54 is constrained in a state inclined obliquely with respect to the vehicle vertical direction of the vehicle in which the normal unit-side constraint point 54a by the second normal-charge harness clip 54 facing the front of the vehicle. In other words, the second normal-charge harness clip 54 constrains the normal charging harness 44 in a state inclined forwardly. Also, the normal unit-side constraint point 54a by the second normal-charge harness clip 54 is located forwardly and upwardly of the vehicle than the quick-charge unit-side constraint point 52a by the second quick-charge harness clip 52. That is, between the quick unit-side constraint point 52a and the normal unit-side constraint point 54a, a distance (gap) indicated by ΔW in FIG. 8B is generated in the vehicle longitudinal direction. Further, between the quick unit-side constraint point 52a and the normal unit-side constraint point 54a, a distance (gap) indicated ΔH in FIG. 8A is generated in the vertical direction of the vehicle. As a result, the length of the normal charging harness 44 between the normal body-side constraint point 53a and the normal unit-side constraint point 54a will be shorter than the length of the quick-charge harness 43 between the quick body-side constraint point 51a and the quick unit-side constraint point 52a. Note that the "normal unit-side constraint point" refers to an end on the side of the charging port 30 out of the portion of the normal charging harness 44 that is constrained by the second normal-charge harness clip 54.

Now, the operation will be described. Firstly, description is given of the "Support structure of the power unit and the charging port and the problem", then, the operation of the harness routing structure of the electric vehicle in the first embodiment will be described separately in the "Harness interference prevention function", and the "Deformation suppression effect due to self-weight," in the first embodiment.

Support Structure of the Power Unit and the Charging Port and the Problem

In the electric vehicle 1 of the first embodiment, the quick charging port 31 of the charging port 30 is properly connected with a quick charger. Further, the normal charging port 32 is properly connected with a low-voltage AC power source. Therefore, it is necessary for the charging port 30 with the quick charging port 31 and the normal charging port 32 to be fixed in the position with respect to the vehicle body. To this end, the charging port 30 is fixedly supported on the vehicle body via the charging port bracket 33.

On the other hand, the electric motor 12 is vibrated by the rotor rotation at the time of driving. Here, the electric motor 12 is incorporated in the motor housing 14 of the motor drive unit 11, and, on the upper portion of the motor housing 14, the high-voltage unit 15 is mounted integrally. Therefore, when the electric motor 12 is vibrated, not only the drive unit 11 but also the high-voltage unit 15 vibrates so that the entire power unit 10 vibrates integrally. In order to prevent the vibration of the power unit from transmitting to the vehicle body, the power unit 10 is elastically supported on the vehicle body via a mount member 5.

Thus, during vibration of the power unit 10, vibration is absorbed by the mount member 5 and is not transmitted to the vehicle body so that the charging port 30 will not vibrate. In other words, when the power unit 10 is vibrated, the power unit 10 and the charging port 30 move relatively to each other so that the interval between the power unit 10 and the charging port 30 will be narrower or wider.

In contrast, the power unit 10 and the quick charging port 31 of the charging port 30 are connected via the quick charging harness 43. Further, the intermediate portions of the quick charging harness 43 is fixed to the vehicle body by the first quick-charge harness clip 51 on the one hand, and is fixed to the power unit 10 by the second quick-charge harness clip 52. Furthermore, by deflecting the quick charging harness 43 between the first quick-charge harness clip 51 and the second quick-charge harness clip 52, the deformation of the harness will be allowed during a relative movement of the power unit 10 and the charging port 30, thus allowing the relative movement of these. In addition, the power unit 10 and the normal charging port 32 of the charging port 30 are connected via the normal charging harness 44. Further, the intermediate portions of the normal charging harness 44 is fixed to the vehicle body by the first normal-charge harness clip 53 on the one hand, and is fixed to the power unit 10 by the second normal-charge harness clip 54. Furthermore, by deflecting the normal charging harness 44 between the first normal-charge harness clip 53 and the second normal-charge harness clip 54, the deformation of the harness will be allowed during a relative movement of the power unit 10 and the charging port 30, thus allowing the relative movement of these.

Here, the normal charging harness 44 has more flexibility than the quick charging harness 43 so that the normal charging harness is more easily deformed than the quick charging harness 43 in response to the vibration of the power unit 10. Therefore, when assuming that the length of the quick charging harness 43 between the quick body-side constraint point 51a by the first quick-charge harness clip 51 and the quick unit-side constraint point 52a by the second quick-charge harness clip 52 is dimensioned as about the same length of the normal charging harness 44 between the normal body-side constraint point 53a by the first normal-charge harness clip 53 and the normal unit-side constraint point 54a by the second normal-charge harness clip 54, in response to the same vibration input, the amount of deformation of the normal charging harness 44 will be larger than the amount of deformation of the quick charging harness 43.

Thus, the normal charging harness 44 may be brought into contact with the quick charging harness 43 leading to interference between both charging harnesses. As a result, a sound of interference may generate or each charging harness (normal charging harness 44 in particular) may sometimes suffer scratches.

Harness Interference Prevention Function

In the electric vehicle 1 of the first embodiment, when the vehicle body is shaking heavily due to a vehicle start or vehicle stop operations, the power unit 10 elastically mounted on the vehicle body will vibrate and swing in all directions including in the longitudinal direction, in the width (lateral or left to right direction), and in the vertical direction. Accordingly, as compared to the state in which the power unit is stationary. the spacing dimension or interval between the quick body-side constraint point 51a by the first quick-charge harness clip 51 fixed to the vehicle body and the quick unit-side constraint point 52a by the second quick-charge harness clip 52 fixed to the power unit 10 relatively widens or narrows in the vibrating direction. The same holds true for the spacing dimension between the normal body-side constraint point 53a by the normal-charge harness clip 53 fixed to the vehicle body and the normal unit-side constraint point 54a by the second normal-charge harness clip 54.

It should be noted that, when the power unit 10 vibrates, the variation in the spacing dimension between the quick body-side constraint point 51a and the quick unit-side constraint point 52a will be about the same degree as the variations in the spacing dimension between the normal body-die constraint point 53a and the normal unit-side constraint point 54a.

In response to this state, in the first embodiment, the quick charging harness 43 is bent between the quick body-side constraint point 51a and the quick unit-side constraint point 52a, and the normal charging harness 44 is also bent between normal body-side constraint point 53a and the normal unit-side constraint point 54a. Thus, in response to the vibration of the power unit 10, in accordance with the variations in the spacing dimensions between respective constraint points, both the quick charging harness 43 and the normal charging harness 44 will deformed, respectively.

At this time, in the first embodiment, the length of the normal charging harness 44 between the normal body-side constraint point 53a and the normal unit-side constraint points 54a is set shorter than the length of the quick charging harness 43 between the quick body-side constraint point 51a and the quick unit-side constraint point 52a. That is, the length of the normal charging harness that is relatively more flexible and deformable is shorter in the length of the non-constraint, free portion than the quick charging harness 43 that is less deformable. Further, by shortening the harness length of the free portion, the deformation of the normal charging harness 44 is suppressed in response to vibration input so that the vibration state or degree may be set substantially the same between the quick charging harness 43 and the normal charging harness 44.

Thus, when the power unit 10 is vibrated, the normal charging harness 44 and the rapid charging harness 43 are deformed in the same way, it is possible to prevent an interfere with each other, thereby suppressing the generation of interference noise or occurrence of harnesses damage.

In particular, in the harness routing structure in the first embodiment, the vehicle longitudinal position of the quick body-side constraint point 51*a* is consistent with that of the normal body-side constraint point 53*a*. In addition, compared to the vehicle longitudinal position of the quick unit-side constraint point 52*a* that is fixed to the power unit 10 and is subject to vibration along with the power unit 10, the vehicle longitudinal position of the normal unit-side constraint point 54*a* is disposed further forward of the vehicle. That is, by shifting the position of the constraint point on the vibration input side to the quick charging harness 43 (quick unit-side constraint point 52*a*) and the position of the constraint point of the vibration input side to the normal charging harness 44 8 normal unit-side constraint point 54*a*), the vibration state or degree of both charging harness 43, 44 may be adjusted to assume the same extent. Thus, in the vicinity of the power unit 10 which is a vibration source, the space between the normal charging harness 44 and rapid charging harness 43 may be widened. Further, the interference between the harnesses may be prevented.

It should be noted that each charging harness 43, 44 may be easily routed or arranged by disposing the constraint points on the fixed side of each of the charging harness 43, 44 (quick body-side constraint point 51*a*, normal body-side constraint point 53*a*) close to each other.

Moreover, in the harness routing structure in the first embodiment, with respect to the constraint points on the vibration input side, the vehicle vertical position of the normal unit-side constraint point 54*a* is disposed higher than the vehicle vertical position of the quick unit-side constraint point 52*a*. Therefore, in the vicinity of the power unit 10 which is a vibration source, it is possible to widen the distance between the normal charging harness 44 and the quick charging harness 43, to further improve an interference prevention effect of the harness.

Deformation Suppression Effect Due to Self-Weight

The normal charging harness 44 has rigidity which ensures to be deformable by its own weight, and, when imparting an allowance (flexure or deflection) in the free portion that is not restrained, the harness 44 is pulled downward by its own weight and hangs down excessively.

In contrast, in the second normal-charge harness clip 54 of the first embodiment, the normal unit-side constraint point 54*a* is faced forward with respect to the vehicle vertical direction and restrains the normal-charge harness 44 in a state inclined obliquely. That is, the normal charging harness 44 is supported so as to be pulled up above at the normal unit-side constraint point 54*a*. Thus, the deformation of the normal charging harness 44 may be suppressed. Even when an allowance (flexures) is allowed for the non-constraint, free portion, the harness 44 may be prevented from hanging down excessively due to its own weight.

Now, a description is given of the effect. In accordance with a harness routing structure of the electric vehicle in the first embodiment, it is possible to obtain the effects listed below.

(1) Provided are: an electric motor 12 as a drive source, a high-voltage unit 15 (control device) to control the electric motor 12 as well as charging of a battery unit 20 (battery) for a power supply to the electric motor, a power unit 10 elastically supported on a front side member 3 and a first front cross member 4A (vehicle body), a quick charging port 31 fixedly supported on a second front cross member 4B (vehicle body), a normal charging port 32 fixedly supported on the second front cross member 4B (vehicle body), a quick charging harness 43 to connect the power unit 10 and the quick charging port 31; a normal charging harness 44 to connect the power unit 10 and the normal charging port 32 and having a more flexibility than the quick charging harness 43, a first quick-charge harness clip 51 by which an intermediate portion of the quick charging harness 43 is fixed to the second front cross member 4*b*, a second quick-charge harness clip 52 by which an intermediate portion of the quick charging harness 43 between the first quick-charge harness clip 51 and the power unit 10 is fixed to the power unit 10, a first normal-charge harness clip 53 by which an intermediate portion of the normal charging harness 44 is fixed to the second cross member 4B, and a second normal-charge harness clip 54 by which an intermediate portion of the normal charging harness 44 between the first normal-charge harness clip 53 and the power unit 10 is fixed to the power unit 10, wherein the normal charging harness 44 between the normal body-side constraint point 53*a* by the first normal-charge harness clip 53 and the normal unit-side constraint point 54*a* by the second normal-charge harness clip 54 is configured to be shorter in length that the quick charging harness 43 between the quick body-side constraint point 51*a* by the first quick-charge harness clip 51 and the quick unit-side constraint point 52*a* by the second quick-charge harness clip 52. Thus, when connecting the relatively movable power unit 10 and the charging ports (quick charging port 31, normal charging port 32) by the quick charging harness 43 and the normal charging harness 44, it is possible to prevent the interference of both charging harness 43, 44.

(2) The quick body-side constraint point 51*a* is aligned with the normal body-side constraint point 53*a* in the vehicle longitudinal position, and the normal unit-side constraint point 54*a* is located forward of the vehicle than the quick-charge unit-side constraint point 52*a* in the vehicle longitudinal position.

Thus, in the vicinity of the power unit 10 which is a vibration source, the space between the normal charging harness 44 and rapid charging harness 43 may be widened and both harnesses are less likely to interference.

(3) The vehicle vertical position of the normal unit-side constraint point 54*a* is disposed higher than the vehicle vertical position of the quick unit-side constraint point 52*a*. Therefore, in the vicinity of the power unit 10 which is a vibration source, it is possible to widen the distance between the normal charging harness 44 and the quick charging harness 43, and both harnesses are less likely to be interference.

(4) In the second normal-charge harness clip 54, the normal unit-side constraint point 54*a* is faced forward with respect to the vehicle vertical direction and restrains the normal-charge harness 44 in a state inclined obliquely. Thus, the normal charging harness 44 is supported so as to be pulled up above at the normal unit-side constraint point 54*a* so that the normal charging harness may be prevented from hanging down excessively due to its own weight.

The harness routing structure for an electric vehicle according to the present invention has been described above based on the first embodiment. The specific configuration is not limited to the embodiment. Rather, design modifications or additions may be allowed as long as they do not depart from the spirit of the invention pertaining to each claims In the harness routing structure in the first embodiment, the charging port 30 is configured to be disposed forward of the power unit 10. However, for example, the charging port 30 may be configured to be disposed rearward of the power unit 10. In sum, the harness routing structure according to the present invention may be applicable to an electric vehicle in which a power unit elastically supported on a vehicle body and a charging port fixedly supported on a vehicle body are connected to each other by a charging harness.

The invention claimed is:

1. An electric vehicle harness routing structure adapted to be coupled to a power unit elastically supported on a vehicle body, the harness routing structure comprising:
a charging port fixedly supported on the vehicle body;
a quick charging harness configured to be connected to the power unit and the charging port;
a normal charging harness configured to be connected to the power unit and the charging port, the normal charging harness being more flexible than the quick-charge harness;
a first quick-charge harness clip coupled to a first intermediate portion of the quick charging harness, the first quick-charge harness clip being configured to be fixed to the vehicle body,
a second quick-charge harness clip coupled to a second intermediate portion of the quick charging harness between the first quick-charge harness clip and the power unit, the first quick-charge harness clip being configured to be fixed to the power unit,
a first normal-charge harness clip coupled to a first intermediate portion of the normal charging harness, the first normal-charge harness clip being configured to be fixed to the vehicle body; and
a second normal-charge harness clip by coupled to a second intermediate portion of the normal charging harness between the first normal-charge harness clip and the power unit, the second normal-charge harness clip being configured to be fixed to the power unit,
the normal charging harness between a normal body-side constraint point adjacent to the first normal-charge harness clip and a normal unit-side constraint point by adjacent to the second normal-charge harness clip is shorter in length than the quick charging harness between the quick body-side constraint point adjacent to the first quick-charge harness clip and the second quick unit-side constraint point adjacent to the second quick-charge harness clip.

2. The electric vehicle harness routing structure as claimed in claim 1, wherein the quick body-side constraint point is aligned with the normal body-side constraint point as viewed in a vehicle longitudinal direction, and the normal unit-side constraint point is located more forward than the quick-charge unit-side constraint point with respect to the vehicle longitudinal direction.

3. The electric vehicle harness routing structure as claimed in claim 1, wherein
the normal unit-side constraint point is disposed at a higher vehicle vertical position than a vehicle vertical position of the quick unit-side constraint point.

4. The electric vehicle harness routing structure as claimed in claim 1, wherein
the second normal-charge harness clip is arranged such that the normal unit-side constraint point is angled forward with respect to a vehicle vertical direction and thereby restraining the normal-charge harness in an obliquely inclined state.

5. The electric vehicle harness routing structure as claimed in claim 2, wherein
the normal unit-side constraint point is disposed at a higher vehicle vertical position than a vehicle vertical position of the quick unit-side constraint point.

6. The electric vehicle harness routing structure as claimed in claim 5, wherein
the second normal-charge harness clip is arranged such that the normal unit-side constraint point is angled forward with respect to a vehicle vertical direction and thereby restraining the normal-charge harness in an obliquely inclined state.

7. The electric vehicle harness routing structure as claimed in claim 2, wherein
the second normal-charge harness clip is arranged such that the normal unit-side constraint point is angled forward with respect to a vehicle vertical direction and thereby restraining the normal-charge harness in an obliquely inclined state.

8. The electric vehicle harness routing structure as claimed in claim 3, wherein
the second normal-charge harness clip is arranged such that the normal unit-side constraint point is angled forward with respect to a vehicle vertical direction and thereby restraining the normal-charge harness in an obliquely inclined state.

* * * * *